J. B. CAINE.
NUT LOCKING WASHER.
APPLICATION FILED MAR. 19, 1909.
933,886. Patented Sept. 14, 1909.
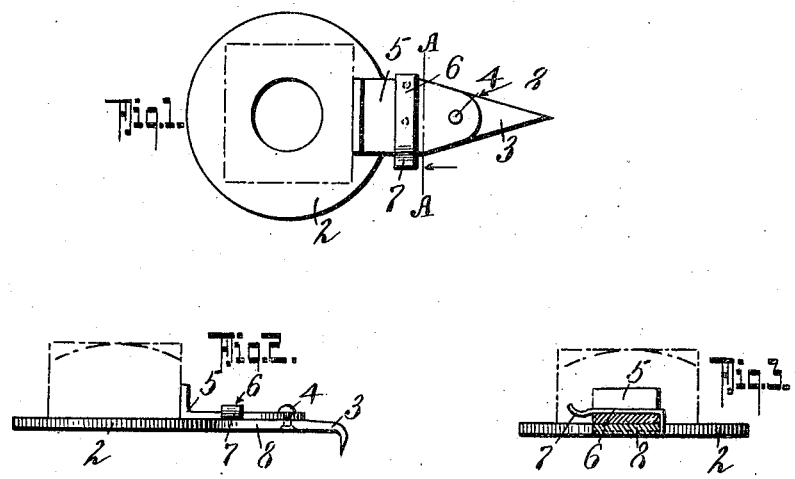
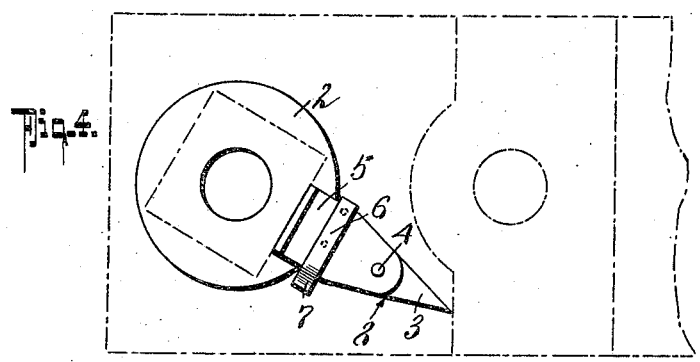
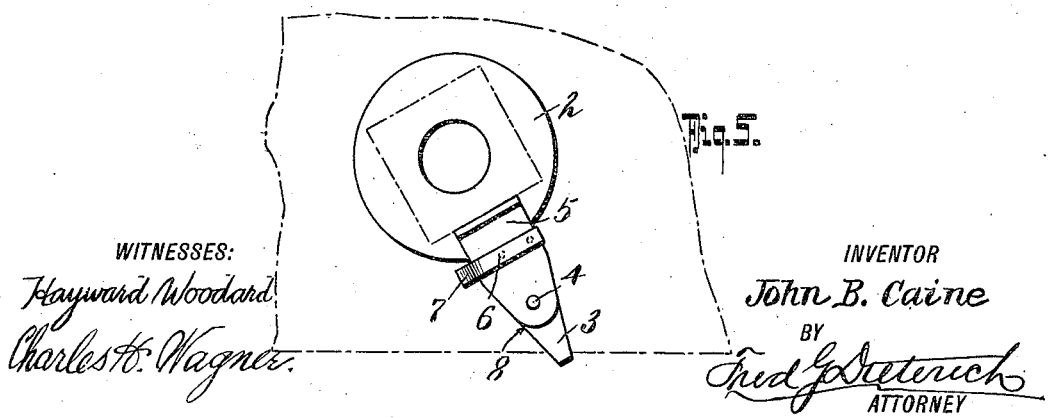
WITNESSES:
Hayward Woodard
Charles H. Wagner
INVENTOR
John B. Caine
BY
Fred G. Dieterich
ATTORNEY

UNITED STATES PATENT OFFICE.

JOHN B. CAINE, OF BELLINGHAM, WASHINGTON.

NUT-LOCKING WASHER.

933,886.  Specification of Letters Patent.  Patented Sept. 14, 1909.

Application filed March 19, 1909. Serial No. 484,581.

*To all whom it may concern:*

Be it known that I, JOHN B. CAINE, a citizen of the United States of America, residing at Bellingham, Washington, have invented a new and useful Nut-Lock Washer, of which the following is a specification.

This invention relates to a nut lock washer and has for its object the provision of a simple and efficient means for securing a nut against slacking back and one that is susceptible of a variety of applications whether on wood or iron.

The invention is particularly described in the following specification and illustrated by the drawings by which it is accompanied, in which;

Figure 1. is a plan of the washer, the position of the nut being indicated by dot and dash lines, Fig. 2. a side elevation of the same with the engaging point turned down Fig. 3. a cross section on the line A A in Fig. 1 showing the resilient check for securing the nut lock member and Figs. 4 and 5 show the application of the lock washer to secure the nut of an ordinary bearing box and as applied to a washer plate.

In these drawings 2 represents an ordinary ring washer to be placed under a nut and having a projection 8 from one side which is produced to form a flattened point as at 3 which when required may be bent down as shown in Fig. 2. To this projection 8 is pivotally connected by a rivet 4 a nut engaging member 5 upwardly turned at the end which is designed to engage the nut. Riveted or otherwise secured to the under side of the projection 8 is a thin resilient check member 6 which is carried across the upper side of the nut engaging member 5 and its free end is downwardly and upwardly turned as at 7 to hold the nut engaging member in the position of engagement with the side of the nut and that will permit the nut engaging member to be moved clear of the nut while it is being turned. Where the washer is applied to a surface having an upward projection adjacent the point 3 need not be turned down as it may be placed to engage such upward projection and prevent rotation. Such an application is shown in Fig. 4 where the washer is applied to secure the nut of an ordinary bearing box. Where however the washer is applied to wood, or to a washer plate as shown in Fig. 5, the point may be turned down so that it will enter the wood or engage the edge of the washer plate and prevent rotation of the washer backward. Where it is applied to a metal plate of such width that the downwardly projecting point cannot engage the edge of the plate an indentation may be made in the plate with a center punch and the point 3 turned down to engage it.

A simple and efficient nut lock washer is thus provided that is susceptible of application to a variety of conditions and wherein the lock engaging member is checked against moving free from such engagement save when required.

Having now particularly described my invention and the manner of its use I hereby declare that what I claim as new and desire to be protected in by Letters Patent is:

A nut lock washer comprising in combination a flat washer having a projection from one side terminating in a flattened point, a nut engaging member pivotally secured to this projection and a resilient check member secured to the under side of the projection and bent over the nut engaging member the free end of the check member being downwardly and upwardly bent to permit the nut engaging member to be moved into position to engage a nut and that will retain it when in that position.

In testimony whereof I have signed my name to this specification in the presence of two subscribing witnesses.

JOHN B. CAINE.

Signed in the presence of—
  ROWLAND BRITTAIN,
  A. G. WOOLSEY.